Nov. 15, 1938. W. ANTTILA 2,136,778
UNDERCARRIAGE CONSTRUCTION FOR AIRCRAFT
Filed July 31, 1937 2 Sheets-Sheet 1
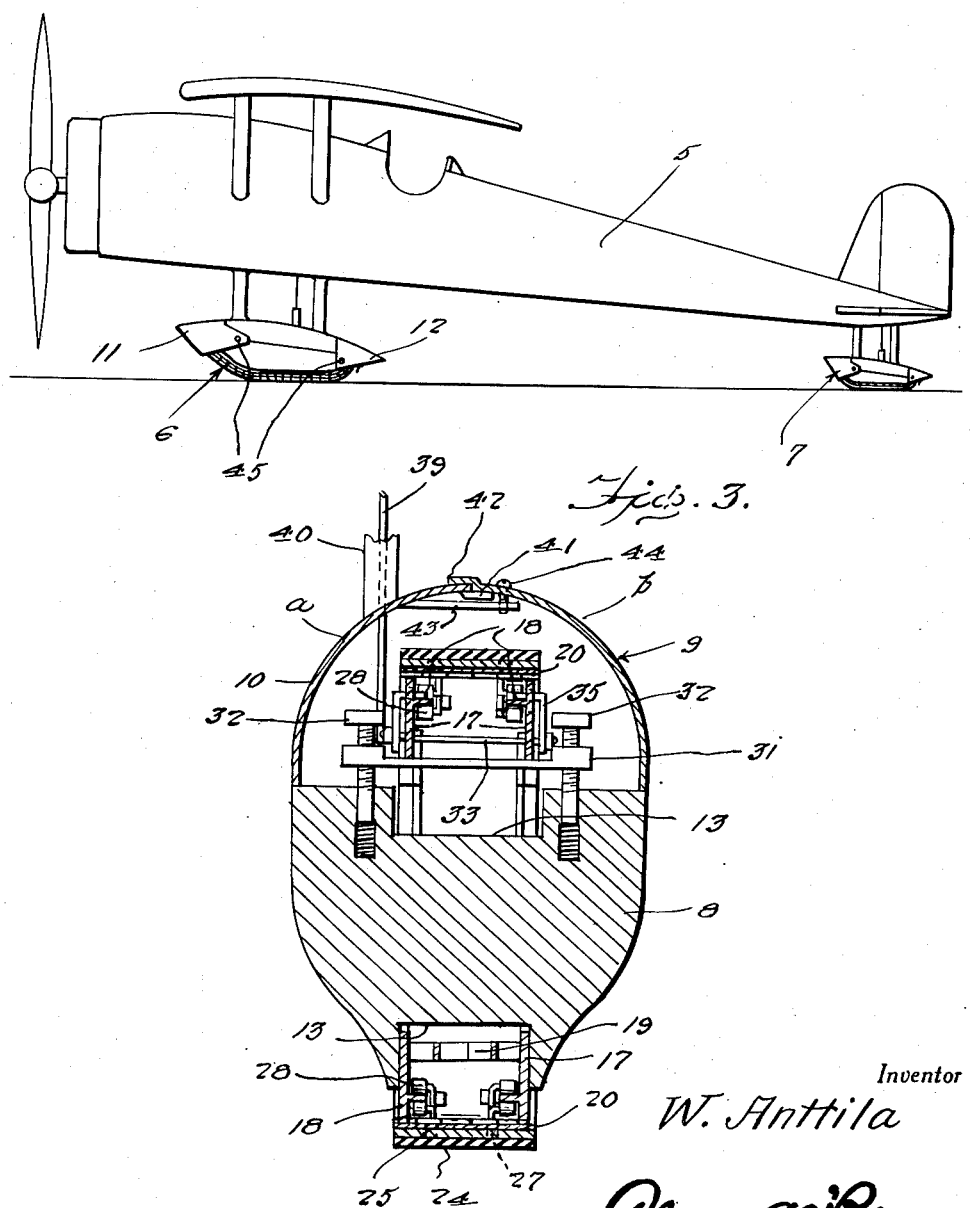
Inventor
W. Anttila
Attorneys Nov. 15, 1938.  W. ANTTILA  2,136,778
UNDERCARRIAGE CONSTRUCTION FOR AIRCRAFT
Filed July 31, 1937  2 Sheets-Sheet 2
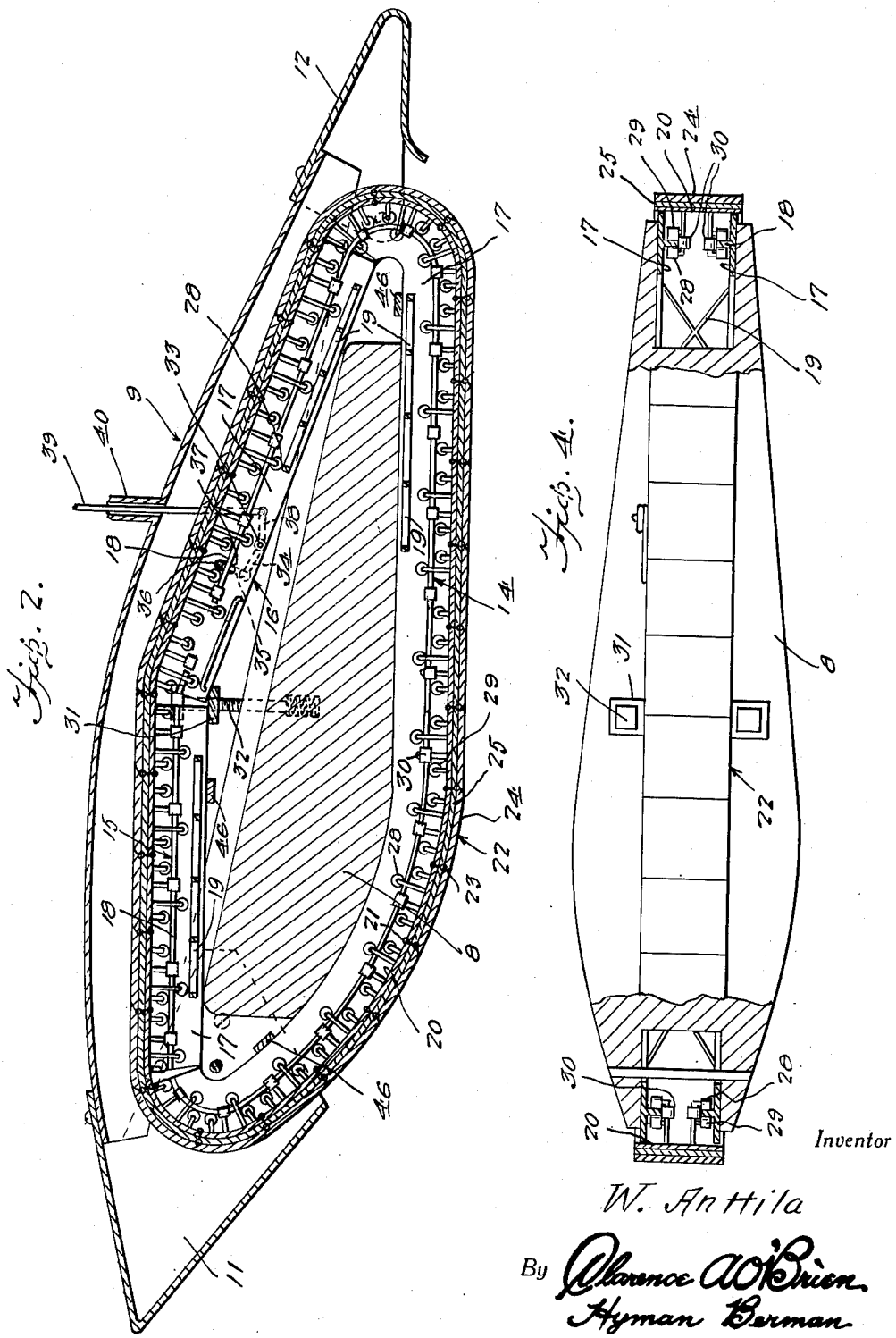
Inventor
W. Anttila
By Clarence A. O'Brien
Hyman Berman
Attorneys Patented Nov. 15, 1938

2,136,778

UNITED STATES PATENT OFFICE 2,136,778

UNDERCARRIAGE CONSTRUCTION FOR AIRCRAFT

Walfred Anttila, Oak Creek, Colo.

Application July 31, 1937, Serial No. 156,807

4 Claims. (Cl. 305—4)

This invention relates to under carriage construction for aircraft and an object of the invention is to provide a landing gear which consists of an endless tractor element or elements and adapted to contact with the ground to ride over the uneven surfaces to the end that the aeroplane may be landed either on land or water and on a rough surface as well as on a smooth landing field.

The invention together with its objects and advantages will be best understood from a study of the following description taken in connection with the accompanying drawings wherein:—

Figure 1 is a side elevational view illustrating the application of the invention to an aeroplane.

Figure 2 is an enlarged sectional view of an endless tractor element embodying the features of the present invention.

Figure 3 is a transverse sectional view taken through the tractor element and

Figure 4 is a top plan view of the tractor element with certain parts removed.

Referring to the drawings by reference numerals it will be seen that 5 indicates generally the fuselage of an aeroplane, and in accordance with the present invention there is provided for the aeroplane and adjacent the forward end thereof a pair of tractor elements 6 while for the rear or tail part of the aeroplane there is provided a similar tractor element 7.

Each tractor element 6, 7 in accordance with the preferred embodiment of the invention comprises a lower body part 8 of suitable shape and dimension and formed of wood, metal or other suitable material together with an upper part 9 which is in the form of a casing 10 of metal or other suitable material and has secured to the front thereof a nose section 11, and to the rear thereof a tail section 12.

The section 8 of the tractor element is provided with a continuous groove 13 in which are arranged, in the present instance track sections 14, 15 and 16, the track section 14 extending along the bottom of the member 8 from one end to the other of the latter and the track sections 15 and 16 being disposed in the groove in the top portion of the member 8 and being adjustable relative to the member 8 as and for the purpose hereinafter made manifest.

Each track section 14, 15 and 16 includes a pair of opposed plates 17 which on their confronting faces are provided with rails 18. Also the plates 17 of the respective sections are braced relative to one another through the medium of suitable gelatin-frame brace structures 19.

An endless tread member comprises a plurality of metallic links 20 hingedly connected together as at 21. These links support a tread surface which in the present instance consists of a plurality of hingedly connected sections 22, the sections 22 being hingedly connected together as at 23, and each section including an outer ply 24 of rubber, leather, or other suitable material, and an inner ply 25 of some suitable fibrous material. By having the outer ply 24 of leather, rubber or analogous material, a suitable friction grip with the ground surface is assured.

The tread surface 22 is held against slipping relative to the endless link assembly by having, in the present instance, the tread sections 22 provided with sockets 26 receiving lugs 27 provided on the links 20.

Also, each link 20 is suitably equipped with rollers 28 that are in riding contact with one side of the rails 18, and with suitably provided rollers 29 that are in riding contact with the rails at the sides of the rails opposite to the rollers 28, with additional rollers 30 that have riding contact with the inner free edges of the rails 18, all of which is believed to be clearly shown in Figures 2, 3 and 4. Thus, through the medium of the aforementioned rollers is the endless tread assembly held in proper engagement with the track sections and the rails thereof.

At the confronting ends thereof the plates 17 of track sections 15 and 16 rest on a cross bar 31 that is secured at the desired adjustment through the medium of adjustment screws 32 threaded into the body 8 of the tractor element, and obviously bar 25 is lowered or raised as found desirable for increasing or taking up slack in the endless traction belt.

To provide a brake for the traction device there is suitably provided a rock shaft 33 that extends between the plates 17 of track section 16, and shaft 33 has projecting therefrom arms 34. Arms 34 have pivotally connected with the outer ends thereof hook-like members 35 the bills or laterally projecting portions 36 of which work through slots 37 provided therefor in the plates 17 of track section 16 and engage portions of the associated rails 18 so that when the shaft 33 is rocked in one direction the rails 18 will be flexed downwardly into frictional binding engagement with the rollers 28 to bind said rollers between the rails 18 and the adjacent braces 19 whereby to apply a braking action to the traction belt.

For rocking the shaft 33 to apply or release this braking action said shaft 33 is provided with a crank arm 38, to one end of which is connected an operating rod 39 that extends into the fusilage 5 of the aeroplane and works through a suitable guide 40 provided therefor. Guide 40 rises from the upper part 9 of the device as shown in Figure 2. It will thus be seen that by pulling upwardly on the operating rod 39 shaft 33 will be rocked for applying the braking action to the traction belt in a manner hereinbefore set out in detail, while a downward push on the rod 39 will result in a release of this braking action.

Referring again to the upper part 9 of the tractor element, it will be seen that the latter is divided longitudinally into two sections $a$, $b$, and that at the meeting edges of these sections said sections are suitably provided as at 41, 42 to provide a lapped and overlapping joint between said sections. Also section $a$ is provided at spaced points with spaced inwardly extending apertured bars 43 while section $b$ is provided at intervals with screws 44 that thread into the apertures of the bars 43 for securing the sections $a$ and $b$ joined together.

Also the nose and tail pieces 11 and 12 fit over the sections 8 and 9 of the tractor element and bolts or other suitable fastening elements 45 serve to secure the parts 11, 12, 9 and 8 in assembled relation.

Also for retaining the track sections 14, 15 and 16 within the groove 13 there are provided at suitable intervals transversely extending retaining bars 46.

In actual practice the traction belts 24 will be found of advantage in landing the aeroplanes on water as well as in traversing snow-covered ground.

It is believed that a clear understanding of the construction, utility and advantages of an invention of this character will be had without a more detailed description thereof.

Having thus described the invention what is claimed as new is:—

1. In an under carriage for aircraft, a tractor element comprising a body member provided with an endless groove extending thereabout, a plurality of track sections arranged within said groove, each track section including a pair of opposed plates connected with the side walls of the groove and provided on their confronting sides with inwardly extending flanges spaced from the outer edges of the plates and forming rails, and an endless traction belt in the form of articulated traction plates, each having rollers mounted thereon and in riding contact with said rails, some of the rollers engaging the inner faces of the flanges, other of the rollers engaging the outer faces of the flanges and some of the rollers engaging the free edges of the flanges.

2. In an under carriage for aircraft, a tractor element comprising a body member provided with an endless groove extending thereabout, a plurality of track sections arranged within said groove, each track section including a pair of opposed plates provided on their confronting sides with rails, and an endless traction belt in the form of articulated traction plates, each having rollers mounted thereon and in riding contact with said rails, and means associated with one of said track sections and the rails thereof for flexing the rails into positive friction engagement with certain of the rollers on several of said articulated traction plates for applying a braking action to said endless traction element.

3. In an under carriage for aircraft, a tractor element comprising a body member provided with an endless groove extending thereabout, a plurality of track sections arranged within said groove, each track section including a pair of opposed plates provided on their confronting sides with rails, and endless traction belt in the form of articulated traction plates, each having rollers mounted thereon and in riding contact with said rails, and an adjusting device associated with certain of said track sections for adjusting the latter in a manner to increase or take up slack in said endless traction element, said adjusting device including a cross bar engaging adjacent ends of a pair of track sections and adjusting screws passing through threaded holes in the cross bar and engaging threaded holes in the body member.

4. An under carriage for aircraft, a tractor element comprising a body member provided with an endless groove extending thereabout, plates engaging the side walls of the groove, inwardly extending rail forming flanges on the confronting sides of said plates and spaced inwardly from the outer edges of said plates, frames connected with the confronting faces of said plates adjacent the inner edges thereof and the frame on one plate abutting the frame on the other plate, an endless traction member and rollers carried thereby and engaging the rail forming flanges.

WALFRED ANTTILA.